US006423391B1

(12) United States Patent
Roth et al.

(10) Patent No.: US 6,423,391 B1
(45) Date of Patent: Jul. 23, 2002

(54) VARIEGATED LABEL SHEET

(75) Inventors: Joseph D. Roth, Springboro, OH (US); Wayne D. Finster, Viroqua, WI (US)

(73) Assignee: NCR Corporation, Dayton, OH (US)

(*) Notice: Subject to any disclaimer, the term of this patent is extended or adjusted under 35 U.S.C. 154(b) by 0 days.

(21) Appl. No.: 09/359,030

(22) Filed: Jul. 22, 1999

(51) Int. Cl.[7] ............................ B32B 9/00; B32B 33/00

(52) U.S. Cl. ....................... 428/42.1; 283/81; 428/40.1; 428/40.5; 428/41.8; 428/42.2; 428/352

(58) Field of Search ............................... 428/40.1, 40.5, 428/418, 42.1, 42.2, 352; 283/81; 156/310

(56) References Cited

U.S. PATENT DOCUMENTS

| | | | | | |
|---|---|---|---|---|---|
| 3,503,782 | A | * | 3/1970 | Ayres | 428/41.8 |
| 4,889,234 | A | * | 12/1989 | Sorensen | 428/40.1 |
| 5,061,535 | A | * | 10/1991 | Kreckel | 428/42.1 |
| 5,071,167 | A | | 12/1991 | O'Brien | 283/79 |
| 5,328,208 | A | | 7/1994 | Garrison | 283/105 |
| 5,580,640 | A | | 12/1996 | Kraft et al. | 428/195 |
| 5,591,290 | A | | 1/1997 | Walter et al. | 156/152 |
| 5,679,427 | A | * | 10/1997 | Instance | 428/40.1 |
| 5,985,396 | A | | 11/1999 | Kerins et al. | 428/41.8 |

FOREIGN PATENT DOCUMENTS

| | | |
|---|---|---|
| EP | 0577977 | 1/1994 |
| GB | 2211759 | 7/1989 |
| GB | 2315727 | 2/1998 |
| GB | 2319762 | 6/1998 |

OTHER PUBLICATIONS

Rawlings, U.S. application No. 09/359,029 (previously cited). No Date.

Roth et al., US Patent Application, "Label Sheet", U.S. application No. 09/114,434; filed Jul. 13, 1998. U.S. Pat. No. 6,217,078.

Roth et al., U.S. Patent Application, "Selective Release Label Sheet", U.S. application No. 09/151,000; filed Sep. 10, 1998.

Rhodia, Inc., "UV–Silicone Cure System", Mar. 9, 1998; 7 pages.

Wallace.com, "New Product Announcements", two page website printed May 1999.

* cited by examiner

*Primary Examiner*—Nasser Ahmad
(74) *Attorney, Agent, or Firm*—Francis L. Conte

(57) ABSTRACT

A label sheet includes a label removably laminated to a release liner by a pair of release bonds having different bond strengths and being repetitive in a variegated pattern.

24 Claims, 9 Drawing Sheets

VARIEGATED LABEL SHEET

BACKGROUND OF THE INVENTION

The present invention relates generally to laminated label sheets, and, more specifically, to label integrity thereof.

Label sheets are commonly available in various configurations with and without printing thereon. A typical label sheet is a laminate of a paper overlay and an underlying release liner. An adhesive bonds the overlay to the liner in the finished article.

In typical use, information is printed atop the overlay, and the overlay is then removed from the liner by being peeled therefrom. The peeled away label has exposed adhesive so that it may be pressed against paper or other object for attachment thereto. A typical release liner is coated over one side with liquid silicone which is thermally cured for providing a low adhesion surface thereatop to which the overlay is temporarily bonded. The adhesive provides a weak bond between the overlay and the silicone liner which sufficiently maintains together the laminate until it is desired to remove the overlay from the liner.

More complex label sheets include several labels or decals in the overlay defined by respective perimeter diecuts therebetween which allow removal of individual labels from the liner. The individual labels may be directly adjacent to each other or there may be an intervening label rim or border which remains attached to the liner after the individual labels are peeled away.

A further increase in complexity of the label sheet includes an integral paper form attached to the label portion of the overlay which does not overlie the liner. This type of label sheet may be manufactured using a lap joining method wherein the label and liner laminate is premanufactured and lap joined along an edge thereof to the paper form. In another, integrated, method of manufacture, the entire overlay, including the label and form portions thereof, is separately manufactured in a common sheet and the liner is then bonded below the label portion thereof.

These various label sheets nevertheless use a commonly fabricated release liner which is typically manufactured in large rolls with the silicone in liquid form being applied over the entire surface of the liner material which is then thermally cured. The large roll of release liner is then cut into individual smaller rolls for use in various label sheet applications as required.

The release coating may be specifically formulated to effect low to high release bonds with the overlay. In use, it is desired to have low release bonds so that the individual labels may be easily removed. This is typically accomplished by bending the label sheet near one of the diecuts to locally break the bond thereat to expose a portion of the label which is then peeled away.

However, if the release bond is too weak, individual labels may separate from the liner during their travel through a laser printer for example. A laser printer may include narrow rollers for guiding the label sheet therethrough, and also includes a fusion roller for heat curing the printing toner on the labels. The heat softens the adhesive, and the narrow rollers bend the sheet tightly which can separate the labels from the liner if insufficient release bonds are used. If a label predispenses in the printer, it not only destroys the usefulness of the label, but can damage the printer by bonding to internal components thereof.

Accordingly, the release bond is typically tailored for a specific type of label sheet and intended printer, and should be suitably strong or tight to prevent predispensing in the printer. This correspondingly high release bond increases the difficulty of manually removing individual labels when desired in use. This can be a significant problem where labels are used in large volume, such as in the pharmacy industry.

Pharmacists typically use the combined label sheet and form for recording various information in a typical pharmaceutical drug transaction which requires one or more individual labels to be removed from the sheet and attached to a prescription drug container. The use of high release bonds in a label sheet to prevent predispensing in a laser printer correspondingly increases the difficulty of removing individual labels from the sheet, and therefore increases the amount of work and time required in completing individual drug transactions.

Accordingly, it is desired to provide an improved label sheet which increases the ease of removing individual labels during use, yet prevents predispensing thereof in a laser printer.

BRIEF SUMMARY OF THE INVENTION

A label sheet includes a label removably laminated to a release liner by a pair of release bonds having different bond strengths and being repetitive in a variegated pattern.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
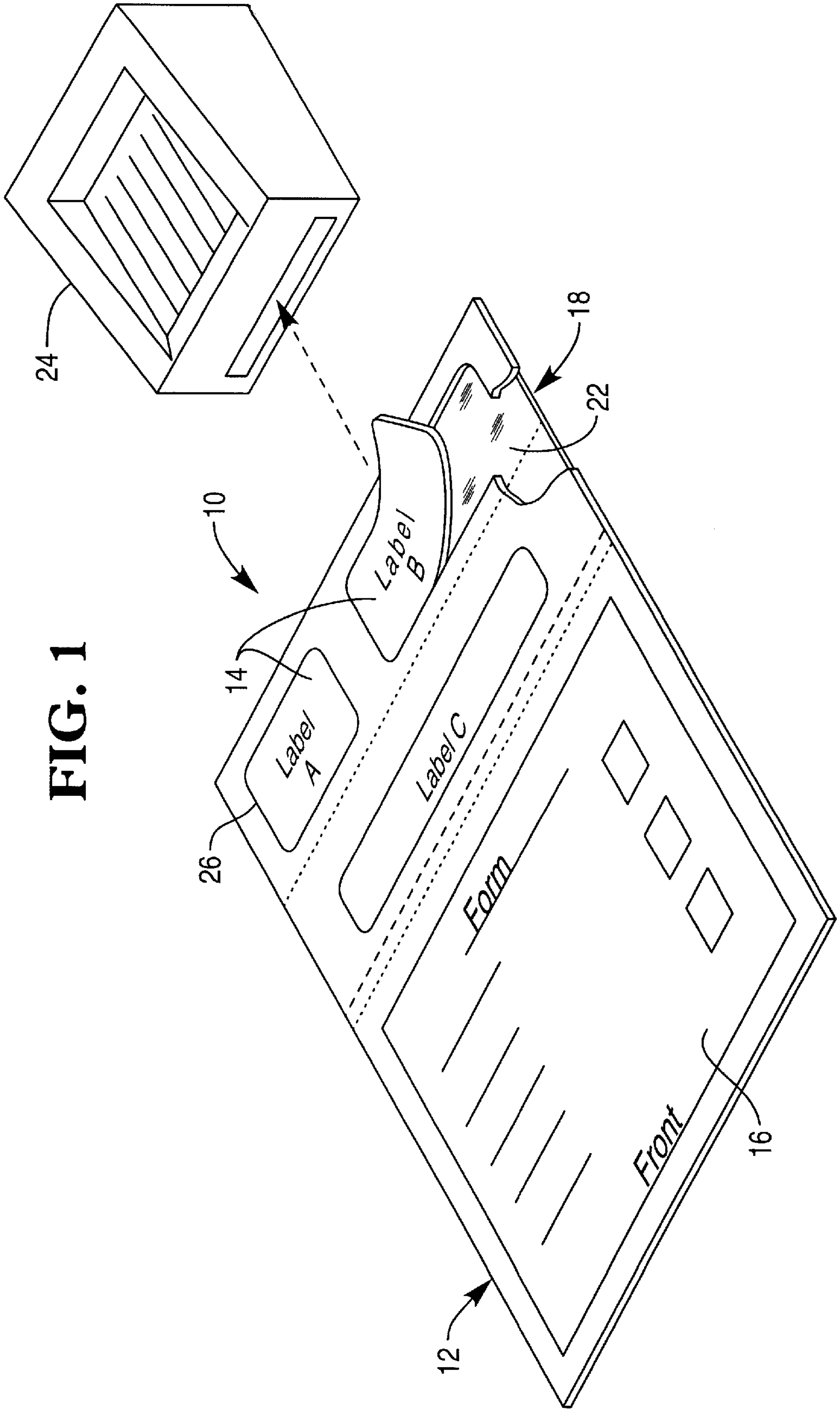
FIG. 1 is an isometric view of the front side of a label sheet in accordance with an exemplary embodiment of the present invention.
Figure 2:
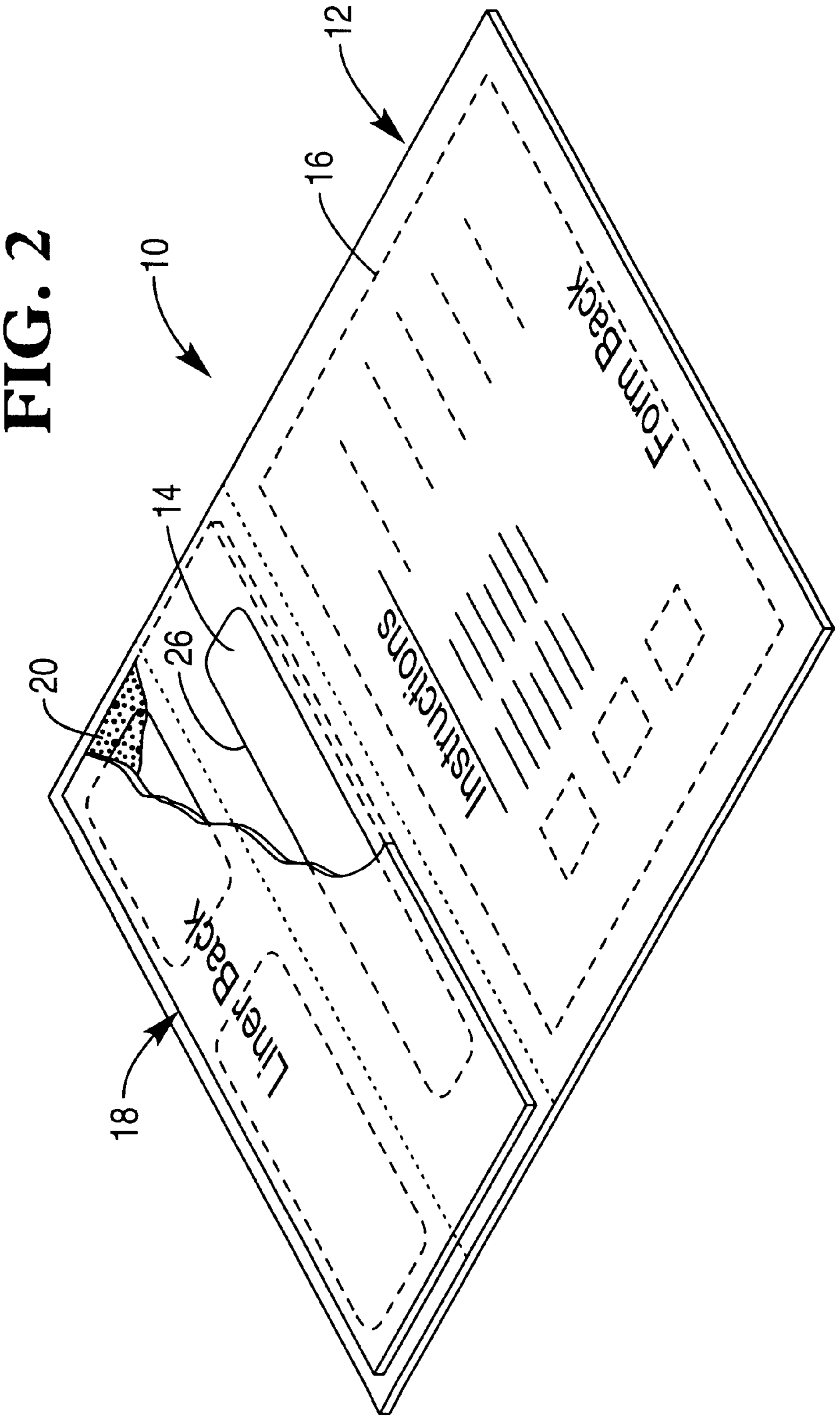
FIG. 2 is an isometric view of the back side of the label sheet illustrated in FIG. 1.

Illustrated in FIGS. 1 and 2 is a label sheet or laminate 10 in accordance with an exemplary embodiment of the present invention. The sheet 10 includes a face sheet or overlay 12 which is preferably a single rectangular paper sheet although it may have other composition and configuration as desired. The overlay includes a front or outer side which may be printed upon or preprinted, and an opposite inner or back side. The overlay also includes one or more individual removable labels 14, and may optionally include a form portion 16 which may be printed front and back.

The label portion of the overlay is laminated to an underlying release liner 18 which includes an inner or front side that faces the overlay back, and an opposite outer or back side. An adhesive 20 is bonded to the label portion of the overlay and removably bonds together the individual labels 14 and the liner 18 in a laminated construction for allowing individual labels 14 to be removed from the liner and then reaffixed to a paper sheet, container, or other article as desired in either permanent or temporary bonds.

The individual labels are rendered removable without damage thereto by applying an integral release 22 in a coating over the front side of the liner 18 for selectively controlling the bonding thereto by the adhesive 20. Release coatings are conventional and include for example a liquid silicone which is applied wet to the liner and then cured using ultraviolet light or heat for example.

As indicated above, a conventional release liner includes a single release coating having the same release characteristics over its entire surface area since the liners are typically manufactured in large rolls and cut to size for specific applications. Similarly, a conventional adhesive has a single adhesive strength and coats the entire label back. The combination of the specific release and the specific adhesive controls the resulting release bond between the label and liner, and its strength.

In accordance with the present invention, the labels 14 are removably laminated to the release liner 18 by a pair of release bonds having different strengths and being repetitive in a variegated pattern to customize or tailor the effective or nominal release bond therebetween. For example, a low release bond having a relatively low release force may be configured along the trailing edge of the labels to allow the portion of the label thereabove to be easily peeled away from the underlying liner. The remainder of the label may have a high release bond requiring a relatively high release force for allowing the portion of the liner thereabove to be peeled away with a substantially greater removal force than that needed for the low release bond. In this way, the individual labels 14 have varying release bonds for maintaining the integrity of the label sheet 10 during printing thereon, yet also allowing the easy removal of individual labels.

More specifically, FIG. 1 illustrates an exemplary laser printer 24 which conventionally includes a hot fusion roller therein and narrow guide rollers along which individual label sheets 10 are guided for printing thereon. The label sheet 10 may have any suitable configuration specifically configured for travel through the exemplary laser printer, or other forms of printers as desired.

In all cases, the label sheet 10 is fed into the printer with its leading edge first entering the printer, and its trailing edge last entering the printer. In FIG. 1, the sheet leading edge is at the top of the sheet with the trailing edge being at the bottom of the sheet. The leading and trailing edges are, of course, dependent upon the specific configuration of the label sheet and the intended feed direction in the corresponding printer. Various label sheets may be either fed top first, bottom first, or sideways as desired, with the first edge entering the printer being the leading edge by definition.

In the exemplary embodiment illustrated in FIGS. 1 and 2, a plurality of the labels 14 are disposed in a common overlay 12 and bonded atop the liner 18. Each label 14 includes a corresponding perimeter 26 which is preferably defined by a continuous die cut through the overlay down to the liner. The diecuts define the perimeter edges of the individual labels, and allow the individual labels to be removed from the remaining portion of the overlay and from the supporting liner 18. Although three exemplary rectangular labels A,B,C are illustrated, the invention may be applied to a single label or any number of labels in any configuration as desired for removing individual labels.

Like the label sheet 10 itself, the individual labels 14 also include a leading edge which first enters the printer 24 illustrated in FIG. 1 followed in turn by corresponding trailing edges of the labels, again defined by the relative travel of the individual labels into the printer 24. The relative travel of the labels is an exemplary design constraint because of the desire to prevent predispensing of the individual labels inside the printer 24 due to the heat and tight bends therein, while also allowing the subsequent easy removal of individual labels manually when desired.

Since the bending of the label sheet in its travel through the printer 24 will tend to first lift and separate the leading edges of the various labels from the underlying liner, the high release bond preferably extends along the leading edge of the individual labels to prevent predispensing thereof.

Correspondingly, the low release bond extends along a different portion of the die cut perimeter including, for example, the label trailing edge. In this way, the label leading edge may be bonded to the liner with a high release force bond selected to prevent predispensing of the label during its travel through the laser printer. And, the trailing edge of the individual labels may be bonded to the liner with a low release force bond for allowing the label to be easily peeled away from the liner manually when desired.

Once a portion of the label is peeled away from the liner, the remaining portion of the label will readily follow notwithstanding the higher release force securing it thereto. In this way, the label sheet 10 may enjoy the benefits of both the high release bond along the leading edges of the labels for preventing predispensing in the printer, while nevertheless being easily removed from the liner when desired by initiating peeling at any portion of the low release force bond.

Since the low and high release bonds are created or effected by the combination of the adhesive 20 joined to the back of the labels 14, and the release 22 joined to the front of the liner 18, the different release forces for the two bonds may be effected by varying either adhesion strength of the adhesive 20, or by varying release value or strength of the release coating 22.

As indicated above, release bond strength between the label and liner may be tailored by interposing small or micro patches of relatively low and high strength release bonds in a repetitive or variegated pattern so that the effective bond strength is a combination of the low and high strength bonds. In this way, the effective release bond may have a strength of any value between the low and high bond strengths depending upon the relative size or area of the different bond patches.

Figure 3:
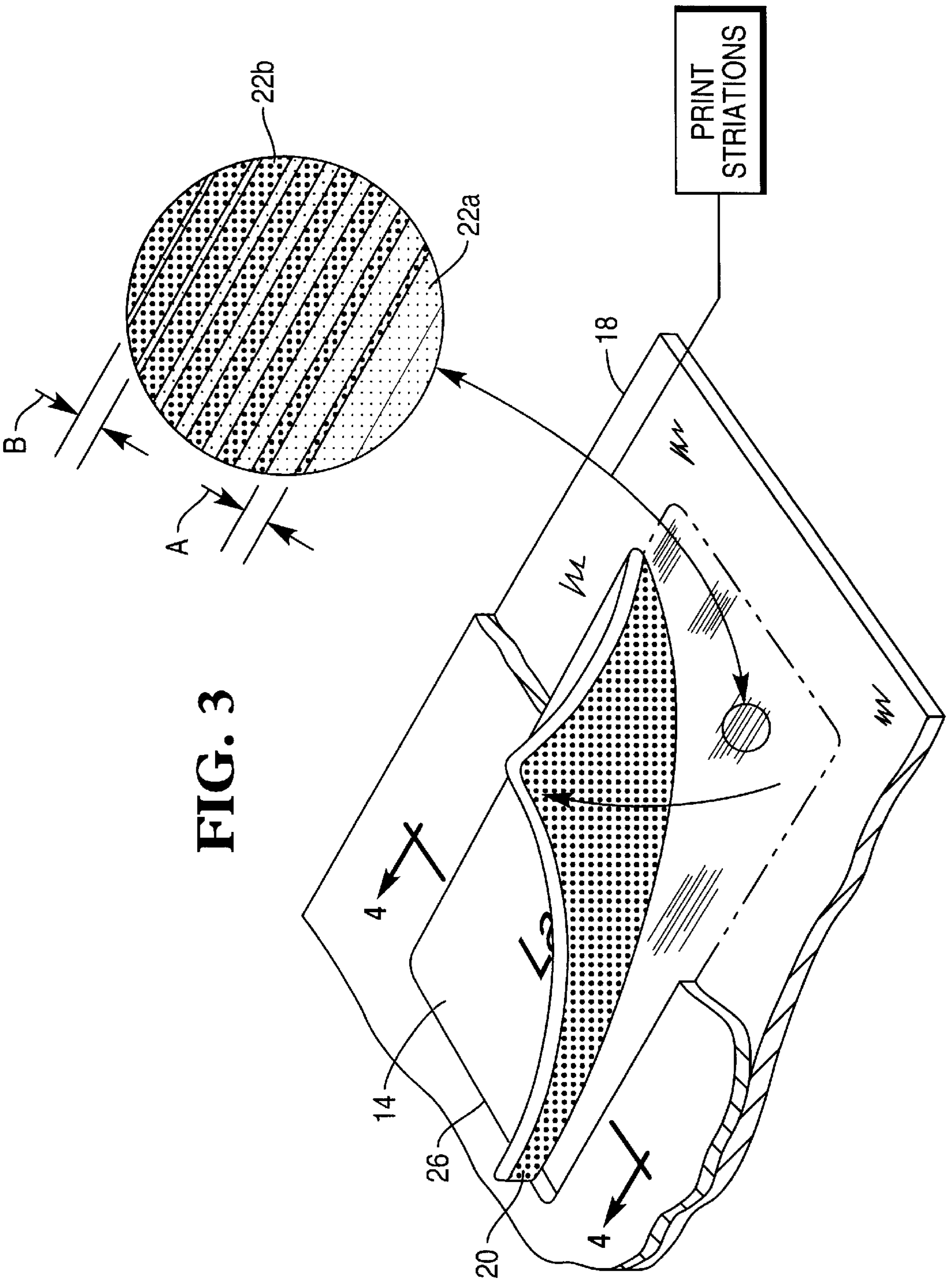
FIG. 3 is an enlarged, partly sectional view of a portion of the label sheet illustrated in FIG. 1 in accordance with an exemplary striated embodiment of the present invention.
Figure 4:
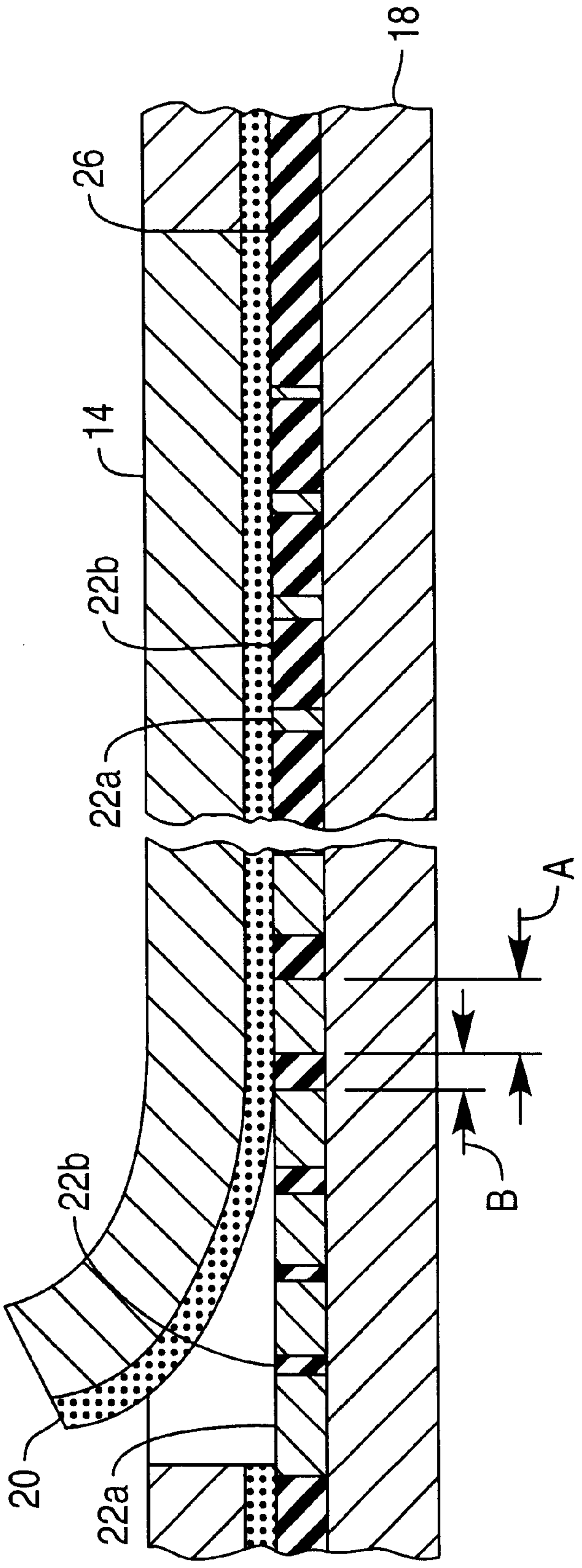
FIG. 4 is an elevational, sectional view through the label sheet illustrated in FIG. 3 and taken along line 4—4.

FIGS. 3 and 4 illustrate an exemplary embodiment of the present invention wherein the release bonds are effected using a single adhesive 20 disposed in a full coating on the back side of the label 14, with a single adhesive strength. The variegated release bond pattern is in the form of striated strips or patches of first and second releases 22*a* and 22*b*. The two releases 22*a*, 22*b* are coated atop the liner and have different release values or strengths to effect with the common adhesive 20 correspondingly different release bond strengths. For example, the first release 22*a* may be a conventional silicone having low release value for a weak bond with the adhesive. The second release 22*b* may a conventional silicone formulated for a high release. value and a strong or tight bond with the cooperating adhesive.

By alternately repeating the first and second releases 22*a,b* in interjacent small or micro patches, a variegated pattern thereof will be created having an effective release bond strength controlled by the relative size or area of the different release patches.

By using a single strength adhesive 20 in the exemplary embodiment, the effective release bond between the label and liner may be customized by controlling the variegated pattern of the two different releases 22*a,b* in various configurations.

As shown in FIGS. 3 and 4, the interjacent release bond patches formed by the alternating releases 22*a,b* individually have different bond strengths and may be correspondingly sized to collectively effect a nominal or effective release bond of intermediate bond strength between the low and high values corresponding with the two releases. The relative size or surface area of the two releases and density may be varied as desired to collectively control the resulting bond strength.

In one example (not shown), the variegated pattern of the two releases may be uniform across the entire label to provide an effective release bond between the label and liner having a bond strength being intermediate the individual bond strengths attributable to the two different releases.

The size or area ratio of the two releases may be varied as desired to control the collective release bond. The use of a greater area ratio for the first release will create a correspondingly low or weak release bond, whereas a greater area ratio for the second release will effect a stronger or tight release bond. The effective release bond may therefore be tailored in strength to any value between the low and high strength bonds effected by the two releases.

As shown in FIGS. 3 and 4, the exemplary label 14 is rectangular and includes a corresponding perimeter 26 having a leading edge along one side, and a trailing edge along an opposite side. The two releases 22*a,b* may be specifically tailored in a corresponding striated pattern to position a low release bond corresponding with the first release 22*a* along the trailing edge of the perimeter, and a high release bond corresponding with the second release 22*b* along, the leading edge. In this way, premature predispensing of the label 14 along its leading edge is prevented, with the trailing edge of the label being easily peeled away from the liner.

In a preferred embodiment, the interjacent release bond patches corresponding to the different releases 22*a,b* are differently sized from each other to effect a gradient release bond along the label in its feed direction between the opposite leading and trailing edges. The strip patches of the first and second releases 22*a,b* have corresponding widths A,B which correspondingly vary between the leading and trailing edges of the label. The striated release patches are uniform in width along their lengths and between their ends to effect uniform release bonds therebetween in the exemplary embodiment.

The relative area of the striated patches may be controlled by their size or width ratio A/B or B/A from pair-to-pair of a adjacent striations to control the effective release bond. By varying the size ratio of the striations along the label 14 between the leading and trailing edges thereof, an effective gradient release bond may be created. In this way, the release bond between the label and liner may steadily decrease from tight to easy from leading to trailing edge, or vice versa. The label leading edge remains tightly bonded to the liner, while the trailing edge may be readily peeled away from the liner which provides additional leverage for peeling the remainder of the label without excessive restraint by the bond increasing in strength to the leading edge.

In the preferred embodiment illustrated in FIGS. 3 and 4, the interjacent striated patches of the first and second releases 22*a,b* inversely change size or width along the label 14 between the opposite leading and trailing edges to effect the gradient in effective release bonds between the label and liner. The two different releases 22*a,b* are dithered or patterned such that the leading edge side of the label is supported atop predominantly tight release silicone, whereas the trailing edge side of the label is supported atop predominantly easy release silicone. The size ratio of the easy to tight silicone release correspondingly changes in a suitable gradient below the leading and trailing edges of the label.

This is illustrated in FIGS. 3 and 4 by the width A of the first release 22*a* having a maximum value below the label trailing edge and a minimum value below the label leading edge, and decreasing in turn therebetween. Correspondingly, the width B of the second release 22*b* has a maximum value below the label leading edge and a minimum value below the label trailing edge, and decreasing in turn therebetween.

The alternating release striations 22*a,b* are thusly arranged in pairs, with the widths A,B thereof inversely varying in size between the opposite leading and trailing edges of the label. The individual widths A,B may be selected based on the specific strength of the adhesive 20 and specific values of the two releases 22*a,b*. The corresponding number of release striations per centimeter may vary as desired in the exemplary range of about ten or more.

In the exemplary embodiment illustrated in FIGS. 3 and 4, the effective release bond between the label and liner may vary substantially smoothly and continuously between the opposite leading and trailing edges. Other gradients or distributions of the effective release bond may be obtained as desired.

Figure 5:
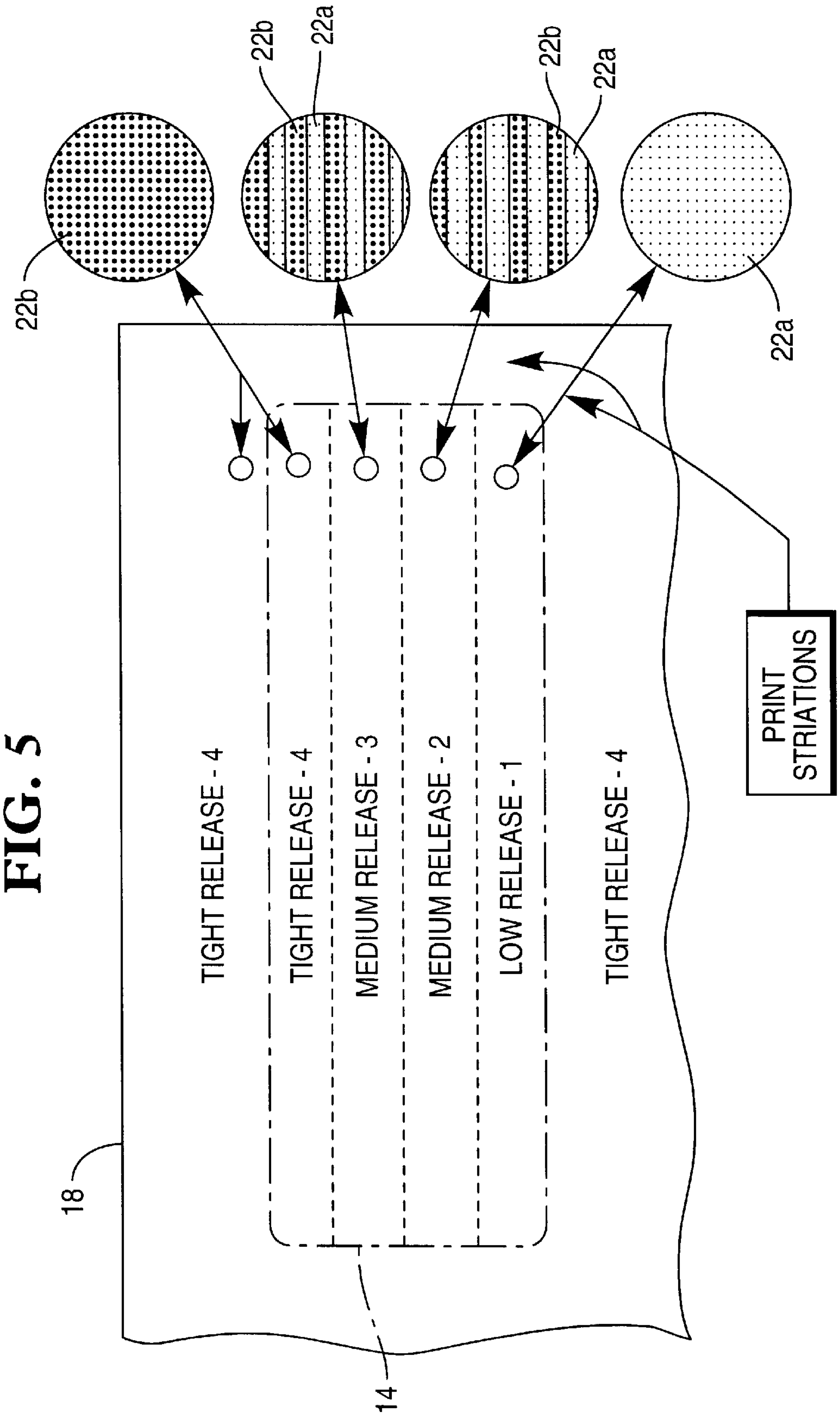
FIG. 5 is a plan view of the liner illustrated in FIG. 3 having variegated release thereon in accordance with another embodiment of the present invention.

For example, FIG. 5 illustrates an alternative embodiment of the variegated striated releases atop the liner 18 and below one of the labels 14 illustrated in phantom. The gradient release provided below the individual labels 14 may have discrete intermediate values ranging from low release (1), to medium releases (2,3), to tight release (4). The liner border surrounding each of the labels preferably has a tight release for strongly securing the label border to the liner. The individual labels are bonded to the liner with a tight release along their leading edges, with decreasing release values to the trailing edge of the label for permitting easy peeling thereat.

The tight release may be provided by using solely the second release 22*b* in a continuous coating atop the liner to border the individual labels and extend a short distance under the leading edges thereof. The low release 22*a* may be provided in a continuous coating below the trailing edge portion of the label.

And, two medium release bonds may be effected in the middle of the label by providing two different striated release patterns of the two releases 22*a,b*. For example, the second medium-release bond may be effected by using the first release 22*a* being wider than the second release 22*b* in the interjacent striations thereof. Correspondingly, the third medium-release bond may be effected using the first release 22*a* narrower in width than the second release 22*b* in interjacent striations thereof.

Figure 6:
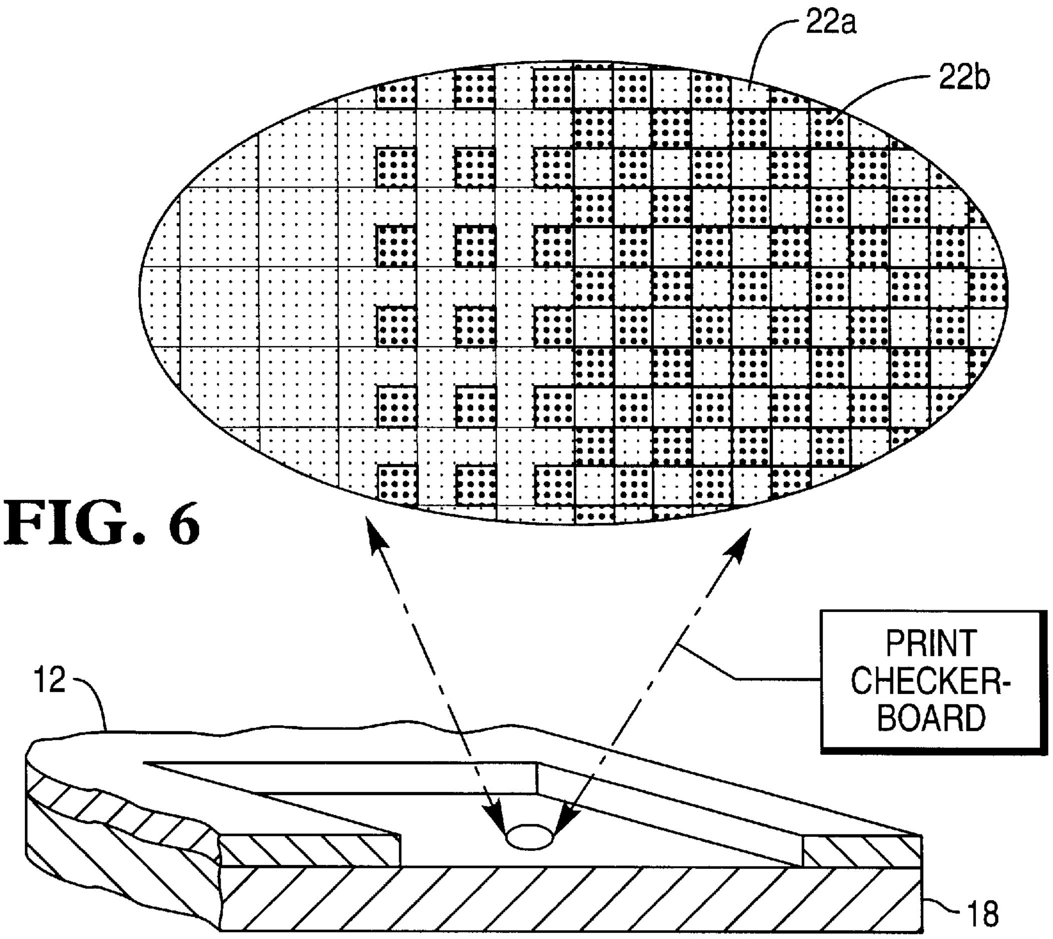
FIG. 6 is a partly sectional, isometric view of the label sheet illustrated in FIG. 3 having release on the liner in accordance with a checkerboard embodiment of the present invention.

The variegated pattern of the release bond between the label and liner may be effected using any desired pattern of the two different releases 22*a,b*. In FIGS. 3–5, the release patches are striated in strips. In FIG. 6, the variegated release bond pattern is in the exemplary form of checkerboard patches or micro patches. The first and second releases 22*a,b* may therefore repetitively alternate in two orthogonal directions.

The exemplary checkerboard pattern illustrated in FIG. 6 includes greater surface area of the second release 22*b* on the liner below the leading edge of the label, with greater surface area of the first release 22*a* below the trailing edge of the liner. The exemplary checkerboard pattern is uniform along the length of the individual labels, but may also vary as desired to further tailor the effective release bond between the label and liner as desired.

Figure 7:
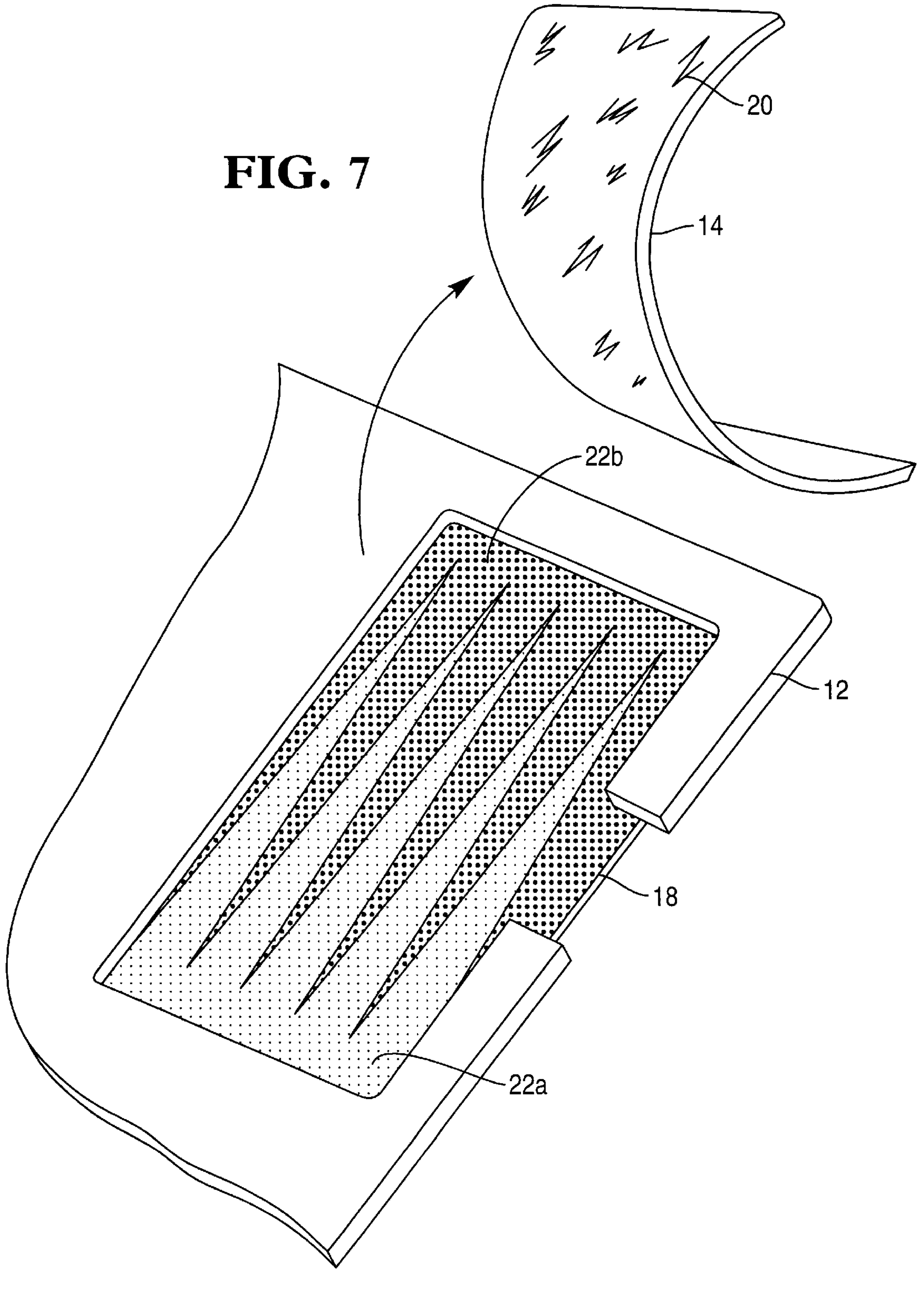
FIG. 7 is a partly sectional, isometric view of the label sheet illustrated in FIG. 3 having release on the liner in accordance with triangular embodiment of the present invention.

FIG. 7 illustrates yet another configuration of the release bond pattern including laterally alternating triangular patches of the first and second releases 22*a,b*. In this embodiment, the triangular release patches 22*a,b* extend between the opposite edges of the label, near the leading edge of the face sheet 12 and away therefrom toward the trailing edge.

The patches are narrower in width than in length, and form narrow triangles alternating laterally across the width thereof. And, the triangular patches 22*a,b* have alternating bases and apexes along the label opposite edges. In the preferred embodiment illustrated, the bases of the tight second release patches 22*b* adjoin each other along a common tight release band below the label leading edge to ensure a tight release bond therewith.

The bases of the low first release patches 22*a* adjoin each other along a common low release band below the trailing edge of the label 14 to permit easy label peeling thereat.

The apexes of the second release patches 22*b* separate the bases of the first release patches 22*a*, and similarly, the apexes of the first release patches 22*a* separate the bases of the second release patches 22*b*.

In this way, the low release bond below the label trailing edges gradually increases in bond strength to the tight release bond below the label leading edge as the collective area of the low release decreases along the height of the triangles and the collective areas of the tight release increases. The area ratio between the low and high releases changes gradually, and permits smooth peeling away of the label from the liner with increasing bond strength, and without abrupt changes in perceived bond strength.

The triangular release patches 22*a,b* are preferably slender and narrow to provide a smooth release bond gradient along the length or height thereof. Alternatively, short, but wide triangular release patches could also be used, where deemed advantageous.

Figure 8:
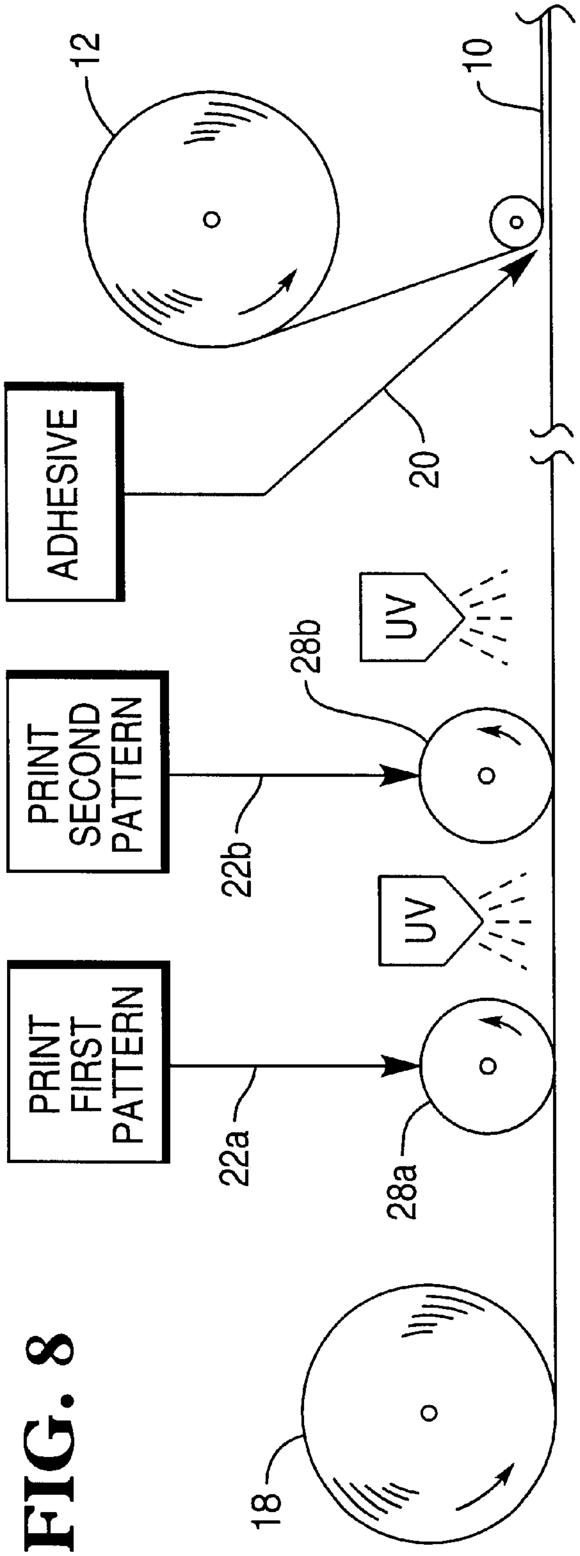
FIG. 8 is a schematic representation of an exemplary method of printing variegated release patterns on a liner laminated with a label sheet overlay.

FIG. 8 illustrates schematically an exemplary method of forming a variegated label sheet 10. The liner 18 is initially provided in a roll of liner material upon which the first and second releases 22*a,b* may be patterned as desired. This may be effected by using two printing towers 28*a,b* which may have any conventional configuration, originally for printing ink, but instead used for printing liquid silicone releases.

In this way, a first pattern corresponding with the first release 22*a* may be printed atop the liner material in any desired configuration. The liquid silicone may then be conventionally cured using ultraviolet (UV) light.

A second pattern corresponding with the second release 22*b* may then be printed atop the liner material in interposition with the first pattern to collectively effect the desired variegated release pattern with interjacent patches or micro patches of the two different releases 22*a,b*. The second release 22*b* is similarly cured using UV light.

The various striated patterns illustrated in FIGS. 3 and 5 may be thusly printed atop the liner, as well as the exemplary checkerboard pattern illustrated in FIG. 6, as well as the exemplary triangular pattern illustrated in FIG. 7, as well as any desired pattern from relatively simple to relatively complex.

In the preferred embodiment, the two patterns of different releases 22*a,b* collectively cover the entire surface of the liner material without discontinuity therebetween to provide a continuous release coating for the adhesive 20 laminated between the liner and face sheet 12 to form the resulting laminated label sheet 10. In order to ensure a continuous coating of the release atop the liner 18, the second release pattern is preferably provided with a small overlap with the interjacent patches of the first pattern to accommodate printing tolerances of the two patterns.

The liner is then laminated with the label face sheet 12 using the adhesive. The laminated label sheet may then be configured in roll form of multiple sheets, or may be cut into individual sheets as desired.

By controlling the first and second patterns of the two releases 22*a,b*, a corresponding release bond effected with the adhesive 20 may be tailored or customized as desired. The size ratio of the first and second release patterns may be varied to collectively effect an effective release bond between the label and liner having intermediate bond strength between the different bond strengths attributable to each of the individual releases. The effective release bond may be uniform across the individual labels, or may vary as desired to effect the gradient release bond between the leading and trailing edges of the label using interjacent patches inversely changing in size or area therebetween.

As indicated above, the release bond between the label and liner is controlled by both the adhesive below the label and the release coating atop the liner. In the exemplary embodiments disclosed above, the adhesive 20 is uniform with a single adhesive strength, with two different releases 22*a,b* being used to tailor the resulting effective release bond.

Figure 9:
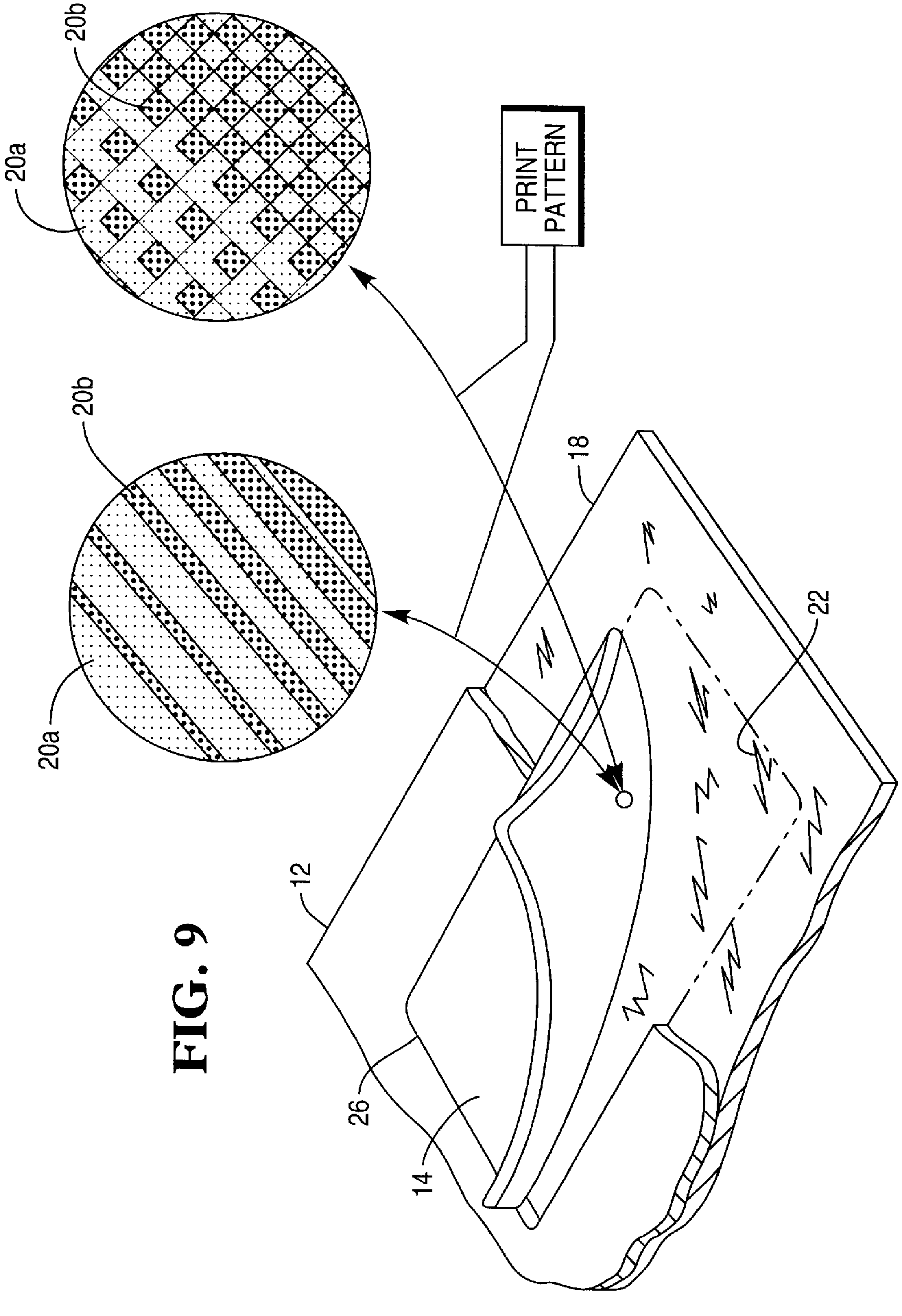
FIG. 9 is a partly sectional, isometric view, like FIG. 3, illustrating variegated label adhesive in accordance with additional embodiments of the present invention.

FIG. 9 illustrates another embodiment of the present invention wherein a single release 22 is used atop the liner 18 and has a single release value or strength. The variegated pattern of release bonds is alternatively effected by using a pair of first and second adhesives 20*a,b* disposed on the back of the label 14 in contact with the common release 22. The first and second adhesives 20*a,b* have different adhesive strengths or values to effect the different release bond strengths with the common release. The variegated adhesive 20*a,b* may be configured in the same patterns, such as the striated or checkerboard or triangular patches, as the two releases disclosed above for enjoying the same benefits.

FIG. 9 illustrates two exemplary embodiments of the variegated adhesive patterns. The striated pattern is sized in surface area to position predominantly low strength adhesive 20*a* along the label trailing edge, and predominantly high strength adhesive 20*b* along the label leading edge. The size ratio of the first and second adhesives 20*a,b* may vary as desired between the opposite leading and trailing edges of the label to effect the various gradient releases described above.

Similarly, the first and second adhesives 20*a,b* may be disposed in the checkerboard pattern illustrated, again for providing predominantly low strength adhesive near the label trailing edge and high strength adhesive near the label leading edge.

In the various embodiments disclosed above, only two different release bonds with different bond strengths may be used in the repetitive variegated pattern to control the effective release bond between the label and liner. The relative surface area and density of the patches may be controlled for customizing the bond strength between the label and liner for any suitable purpose, such as having a tight-bond leading edge and an easy-bond trailing edge.

The variegated release bond pattern may be effected using either two different releases 22*a,b* or two different adhesives 20*a,b*, or both if desired. It is also possible to use more than two different releases or adhesives to further tailor the bond strength between the label and liner if desired.

In all of these embodiments, the specific size of the individual patches of release or adhesive is selected so that the effective release bond is a combination of the individual release bonds effected by the different patches. The smaller the individual patches, the more uniform the effective release bond. The small patches permit their individual bond strengths to be locally averaged between the label and liner. Large patches are therefore not desired since averaging of their bond strengths is prevented in view of the discrete patch bonds between the label and liner.

Accordingly, the use of two different release coatings or adhesives in small patches permits custom release bond profiles to be effected for individual labels. The same manufacturing equipment may therefore be used for tailoring different label designs by simply changing the desired printing patterns of the release, for example, while using only two different release compositions. This adds considerable versatility to the manufacturing process since custom release may be effected using multiple releases in different combinations.

Although individual releases or adhesives may themselves be tailored in composition for obtaining different release bonds, such single composition release bonds require correspondingly configured equipment therefor. And, single composition release bonds cannot enjoy the benefits of varying release bonds across a label in infinite configurations thereof made possible by the present invention.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims.

What is claimed is:

1. A label sheet comprising an adhesive coated label removably laminated to a release coated liner along a continuous plane of lamination effected by a pair of interjacent release bonds between said adhesive and release having different bond strengths and being repetitive in a variegated pattern.

2. A label sheet according to claim 1 wherein said bonds comprise first and second release bonds alternately repeating in interjacent patches to define said pattern.

3. A label sheet according to claim 2 wherein said interjacent release bond patches of different bond strength are correspondingly sized to collectively effect an effective release bond of intermediate bond strength.

4. A label sheet according to claim 3 wherein said interjacent release bond patches are differently sized to effect a gradient release bond along said label.

5. A label sheet according to claim 3 wherein said interjacent release bond patches have a size ratio varying along said label to effect a gradient release bond therealong.

6. A label sheet according to claim 3 wherein said variegated release bond pattern comprises-striated patches.

7. A label sheet according to claim 3 wherein said variegated release bond pattern comprises checkerboard patches.

8. A label sheet according to claim 3 wherein said variegated release bond pattern comprises triangular patches.

9. A label sheet according to claim 3 wherein said release bond pair comprise:

a full coating adhesive disposed on said label; and a corresponding pair of interposed releases adjoining each other to collectively coat said liner in contact with said adhesive, with said release pair having different release values to effect said different release bond strengths.

10. A label sheet according to claim 9 wherein said adhesive has a single strength.

11. A label sheet according to claim 3 wherein said release bond pair comprise:

a single release disposed on said liner; and a corresponding pair of interposed adhesives adjoining each other to collective coat said label in contact with said release, with said adhesive pair having different adhesive strengths to effect said different release bond strengths.

12. A label sheet according to claim 11 wherein said release has a single release value.

13. A label sheet according to claim 3 wherein said label includes a perimeter, and said release bond pattern positions a low release bond along one edge of said perimeter, and a high release bond along an opposite edge.

14. A label sheet according to claim 13 wherein said interjacent release bond patches are differently sized to effect a gradient release bond along said label between said opposite edges.

15. A label sheet according to claim 13 wherein said release bond pair comprise:

a full coating adhesive disposed on said label; and a corresponding pair of interposed releases adjoining each other to collectively coat said liner in contact with said adhesive, with said release pair having different release values to effect said different release bond strengths.

16. A label sheet according to claim 15 wherein said adhesive has a single strength.

17. A label sheet according to claim 15 wherein said variegated release bond pattern comprises striated patches.

18. A label sheet according to claim 15 wherein said variegated release bond pattern comprises checkerboard patches.

19. A label sheet according to claim 15 wherein said variegated release bond pattern comprises triangular patches.

20. A label sheet according to claim 19 wherein said triangular release patches extend between said label opposite edges, and are narrower in width than in length.

21. A label sheet according to claim 20 wherein said triangular release patches have alternating bases and apexes along said label opposite edges.

22. A method of forming a label sheet according to claim 1 comprising:

printing a first release in a first pattern atop said liner;

printing a second release in a second pattern atop said liner, with said first and second patterns being interjacent; and laminating said liner to said label with said adhesive therebetween to effect said different strength release bonds at said first and second release patterns.

23. A method of forming a label sheet comprising:

printing a first release in a first pattern atop a liner;

printing a second release in a second pattern atop said liner, with said first and second patterns being interjacent;

laminating said liner to a label with an adhesive therebetween to effect different strength release bonds at said first and second release patterns; and varying size ratio of said first and second release patterns to collectively effect an effective release bond with a strength intermediate said different strength release bonds.

24. A method according to claim 23 wherein said patterns comprise interjacent patches inversely changing size along said label to effect a gradient in said effective release bond.

* * * * *